Dec. 19, 1961  G. F. FRANK  3,014,159
CONDITION RESPONSIVE CONTROL CIRCUITS
Filed June 15, 1960

Inventor:
Gerald F. Frank,
by William D Roberson
Attorney.

United States Patent Office 3,014,159
Patented Dec. 19, 1961

3,014,159
CONDITION RESPONSIVE CONTROL CIRCUITS
Gerald F. Frank, Bloomington, Ill., assignor to General
Electric Company, a corporation of New York
Filed June 15, 1960, Ser. No. 36,202
6 Claims. (Cl. 317—41)

This invention relates to electrical control systems and more particularly to control circuits for governing the energization of a load device in response to a variable condition. One useful application of the invention is in overtemperature protection for a motor.

Electrical motors which are subject to overheating are often controlled by some sort of device or system which initiates a protective operation to de-energize the motor when the operating temperature exceeds safe limits due to overload conditions or other factors. An automatically operative protector should be capable of automatically re-energizing the motor when the temperature drops again to a safe value. The temperature differential between the de-energization or trip condition and the re-energization or reset condition should ordinarily be limited to a fairly small range, so that the motor does not remain de-energized for an unduly long time following its protective de-energization, but may be re-energized as soon as the temperature has dropped a sufficient amount below the maximum safe operating limit. Where price is no factor, it is possible to design overtemperature protective systems to achieve practically any desired temperature differential between the trip and reset conditions.

Price is usually a factor, however, and it is therefore an object of this invention to provide a comparatively inexpensive control apparatus capable of controlling the energization and de-energization of an electrical load in response to a variable condition within a preselected differential range between those conditions which will result in the load being turned respectively off and on.

It is a further and more particular object of this invention to provide a simple and comparatively inexpensive temperature responsive overload protective system capable of use in controlling the energization of an electrical motor or similar load within a preselected temperature differential range.

Another feature desirable in systems designed to protect against dangerous conditions is often termed "fail-safe" operation. That is, should there be damage or loss of function in the control system due to loose connections, for example, it is an advantage for the control system to perform its protective operation regardless of whether or not the dangerous condition has occurred. Without "fail-safe" operation a protective system would be inert in the face of a dangerous condition and damage to the load device might occur.

For example, in a protective circuit utilizing as a sensing element a thermistor, which has a negative temperature coefficient of resistivity, a dangerous high temperature condition decreases the resistance of the thermistor. The protective function of such a system or circuit usually depends therefore on the decrease in resistance of the thermistor, whereas the higher thermistor resistances resulting from normal operating temperatures prevent a protective de-energization of the load device. But should the thermistor load connection be interrupted, the thermistor becomes for all ordinary purposes a resistor of infinite value and is then powerless to signal by reduction in its resistance the existence of a dangerous high temperature condition. When it is appreciated that the thermistor part of a protective circuit may actually be embedded in a load device such as a motor subject to vibration, thereby to respond to the internal temperatures of the load device, it becomes clear that the loss of circuit continuity through a thermistor is a real problem and an important one.

This invention has as another of its objects the provision of a novel protective apparatus utilizing a condition responsive resistor such as a thermistor or the like to control the energization of an electrical load and responding in a fail-safe manner to an interruption in circuit continuity through the thermistor element to initiate the protective operation.

Although the invention is described herein embodied in an overtemperature protective system, it should be realized at the outset that these teachings also have application in other protective systems in which a condition responsive resistor governs the application of electrical energy to a load device.

By way of a brief summary of a preferred embodiment of this invention, I provide a protective circuit in which the normally open contacts of a relay are connected in series with a load device to control its energization. The relay operating winding is connected in parallel with a transistor which, by its changes in conductance, varies the potential applied to the relay winding. The transistor's conductivity is controlled by a thermistor in the emitter circuit of the transistor, the thermistor being connected to provide a preselected temperature differential between the opening and closing of the relay contacts. The invention further contemplates the use of two bias circuits for controlling the electrical characteristics of the transistor. One of these bias circuits, which I have elected to call the fail-safe bias circuit, is normally rendered inactive by a portion of the current which flows in the thermistor. The fail-safe bias circuit functions to assume control of the system only when the current through the thermistor is interrupted or falls to an unusually low value. It then draws sufficient current through the transistor base to render the transistor highly conductive and therefore drops the potential across the relay operating winding to such a low value that its contacts open to "trip" or de-energize the load.

Further details of the invention as well as additional objects and advantages will be more completely set forth in the following detailed description in connection with the accompanying drawings wherein.

Figure 1:
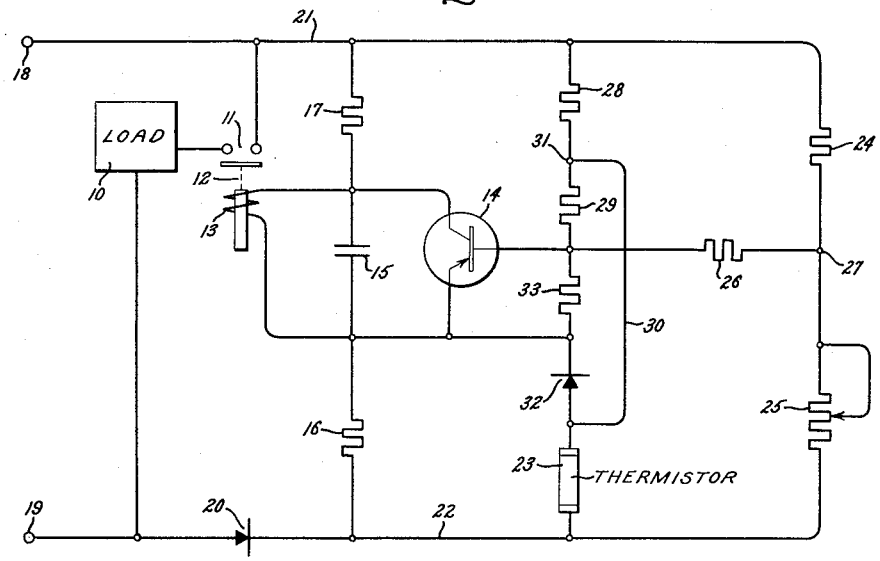
FIG. 1 is a schematic diagram of a preferred embodiment of an electrical protective circuit constructed in accordance with the invention.
Figure 2:
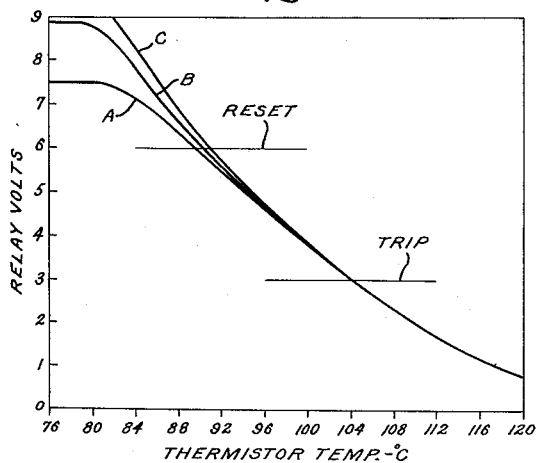
FIG. 2 is a graphical representation of a portion of the operating characteristics of the protective circuit shown in FIG. 1 in which the thermistor temperature is plotted in the abscissa against the relay potential in the ordinate to illustrate the narrow temperature differential between trip and reset conditions for three widely differing supply potentials.
Figure 3:
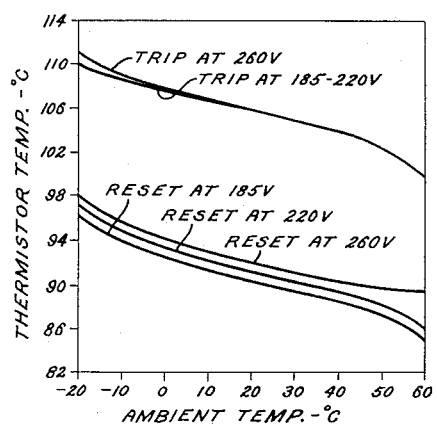
Figure 4:
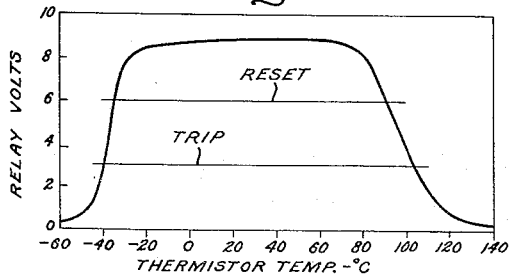

FIG. 3 is a graph of the trip and reset conditions of the FIG. 1 circuit representing the comparatively small effect on the operating characteristics of differing supply potentials and ambient temperatures; and FIG. 4 is a graphical representation of the electrical characteristics of the FIG. 1 circuit similar in nature to FIG. 2 but showing the trip and reset conditions of the circuit at high and at very low thermistor temperatures.

The operation of the circuit shown in FIG. 1 may be conceptualized in more ways than one. Transistors are, of course, current controlled devices. There gain characteristics are usually defined in terms of current rather than in terms of potential. Nevertheless, and although this concept cannot be ignored, I have found it convenient to regard the control circuit described herein as one which controls and is controlled by potentials rather than currents. The fact that this particular mode of description is employed frequently herein should not occasion any confusion as to the basic principles on which the invention is based.

In FIG. 1 load device 10 represents an electrical device the energization of which is to be controlled in accordance with a varying condition. It is to be understood that load 10 need not itself constitute an ultimate load, but may function as a control element for an ultimate load not depicted. For example, load 10 might comprise an electro-magnetic contactor of substantial current rating capable of controlling the currents drawn by a multiple-horsepower motor. The energization of load device 10 is controlled by the opening and closing of the normally open contacts 11 of relay 12. The operating winding 13 of the relay is connected in parallel with pnp transistor 14 and with filtering capacitor 15, the parallel combination of these elements being connected in series with emitter and collector resistors 16 and 17 respectively. An alternating current source represented by supply terminals 18 and 19 supplies half wave rectified direct current to the system through rectifier 20 and supply lines 21 and 22. Control of the conductance of transistor 14 hence of the operating condition of relay 12 is exerted through the influence of a shunt circuit in parallel relationship with emitter resistor 16, the shunt circuit including a condition responsive resistor 23, which in the illustrated example is a thermistor having a negative temperature coefficient of resistance. In a manner to be described below changes in resistance of the condition responsive resistor cause changes in the conductance of the transistor to vary the potential across relay winding 13 thereby to control the operation of normally open contacts 11.

Contributing to the control of transistor 14 there are two bias circuits. One of these is in the form of a simple voltage divider; it includes resistors 24 and 25 connected in series across supply conductors 21 and 22 and an additional resistor 26 connecting the junction point 27 between resistors 24 and 25 to the base of transistor 14. A second bias circuit, which may be termed a fail-safe bias circuit, includes a pair of resistors 28 and 29 connected in series between the base of the transistor and the collector side of the power supply represented by supply line 21. As will be explained more fully below, a conductor 30 connected from the connection point 31 between resistors 28 and 29 to the thermistor 23 results in neutralizing the fail-safe bias circuit so that in normal operation of the control circuit the fail-safe bias circuit is inactive. Between the thermistor 23 and the emitter of transistor 14 is interposed a rectifier 32, the function of which will be explained. A temperature stabilizing resistor 33 is further connected between the emitter and base of transistor 14.

A preferred circuit of the foregoing construction utilizes circuit components of the following values and designations.

| | |
|---|---|
| Transistor 14 | 2N1008. |
| Thermistor 23 | Two General Electric D102 thermistor elements in parallel having a combined resistance of 500 ohms at 25° C. |
| Relay 12 | 320 ohms, rated 8 volts. |
| Capacitor 15 | 50 microfarads, 25 volts. |
| Resistors: | |
| 16 | 150 ohms, ½ watt. |
| 17 | 3.3K, 10 watts. |
| 24 | 15K, 1 watt. |
| 25 | 750 ohms, ½ watt rheostat. |
| 26 | 1K, ½ watt. |
| 28 | 27K, ½ watt. |
| 29 | 3.3K, ½ watt. |
| 33 | 270 ohms, ½ watt. |

Normal operation

In operation the condition responsive resistor 23 may be a thermistor embedded in a motor or the like to be sensitive to the temperatures therein and to signal changes in operating temperatures by variations in its resistance. In the example illustrated it is intended that for a normal, safe operating condition the resistance of thermistor 23 should be such as to permit energization of the load. Thus, the transistor 14 should have sufficient potential dropped across it because of the current flowing in emitter resistor 16, transistor 14, and collector resistor 17 to operate the relay 12 and maintain its contacts in closed position. Cooperating in this function the first bias circuit comprising resistors 24, 25 and 26 places on the base of transistor 14 a normally fixed bias potential. The emitter potential, however, varies depending upon the sum of the currents through the parallel combination of emitter resistor 16 and thermistor 23, the resulting emitter-to-base potential providing the base current to control the conductance of the transistor.

Increasing the control or base current will, of course, increase the conductance of transistor 14 until it reaches a point where the potential across the emitter and collector electrodes, and hence across relay winding 13, is insufficient to maintain the contacts 11 closed. At this point relay 12 "trips" de-energizing the load. This condition is brought about when the thermistor, exposed to an excessively high temperature, decreases in resistance sufficient to render the transistor 14 highly conducting because of its relatively high emitter-to-base potential. When the temperature to which the thermistor 23 is exposed returns to a safe value the resistor of the thermistor increases, the emitter potential becomes less positive with respect to the base potential thereby decreasing the control current of the transistor increases, and the relay "resets"; that is, it closes its contacts.

These functions are illustrated by the FIG. 2 graph in which the temperature of the thermistor 23 is plotted along the abscissa against an ordinate representing the resulting potential developed across relay winding 13, the ambient temperature about the system being constant at about 29° C. This graph includes a family of three curves A, B, and C representing the characteristics of the circuit for supply potentials across terminals 18 and 19 of 185 volts, 220 volts, and 260 volts respectively. The horizontal lines labeled "trip" and "reset" represent the respective potentials at which the relay contacts 11 open and close.

These curves denote several important aspects of the normal operation of the circuit described. First, a relatively small variation in temperature of the thermistor occasions a relatively large variation in the potential across the relay winding. For example at 100° C. the circuit responds to a variation of plus and minus 2° C. by varying the relay potential approximately a full volt, a variation of approximately one volt in four. Because of the relatively large change in relay potential with temperature variations, it is possible in achieving a preselected temperature differential between trip and reset of 14° C. to employ a relay whose reset potential is one hundred percent greater than its trip potential, ranging from three volts across the operating winding at the trip condition to six volts at the reset condition. Thus, for any desired temperature differential of operation, it is possible to utilize a comparatively inexpensive relay having a relatively high operating differential.

The FIG. 2 graph also shows that comparatively wide variations of supply potential between 185 volts and 260 volts occasion practically no variation in the trip condition and only about a 2° C. variation in the reset condition from about 89° C. at 185 volts supply to 91° C. at 260 volts supply.

The graph in FIG. 3, in which the abscissa represents the ambient temperature of the circuit environment and the ordinate is measured in terms of thermistor temperature, illustrates the effect of varying ambient temperatures on the operation of the circuit described above. There are in this figure two groups of curves, an upper group representing the trip points at various supply potentials as labeled, the lower group representing the reset points at various supply potentials as labeled. As can be seen, at ordinary ambient temperatures of about 20° C. supply voltage variations from 185 volts to 260 volts occasion less than one degree variation in the trip point of the thermistor and only about 2° variation in the reset point. Similarly, for any given supply potential such extreme ambient temperature variations as from —20° C. to +60° C. affect the trip and reset points but little, the trip points ranging from about 110° C. to 102° C., the reset points ranging from about 97° C. to 86° C. These significant operating characteristics are obtained, it should be remembered, in a circuit employing a relatively wide differential relay whose contacts close or "reset" at six volts and open or "trip" at three volts.

*Fail-safe operation*

The fail-safe operation of the circuit described above is controlled partly through the influence of the fail-safe bias circuit comprising resistors 28 and 29 and their associated circuit connections. The connection of these two resistors in series between the base of the transistor and the collector side of the power supply might ordinarily result in additional base currents being drawn through the transistor tending to reduce the resistance of the transistor and trip the relay. In normal operation, however, such additional base currents are prevented from flowing. For not only does the thermistor 23 function to vary the emitter potential by its changes in resistance, but also a portion of the current which flows in the thermistor is divided through conductor 30 and resistor 28. Because of the stand-off current in conductor 30 the potential at junction 31 is made sufficiently positive to neutralize the fail-safe bias circuit thereby to prevent it from drawing substantial base currents through the transistor.

If current through the thermistor should be interrupted by a broken lead or for other reasons, the stand-off current through conductor 30 ceases and the fail-safe bias circuit immediately becomes effective to draw a relatively large base current through the transistor and thereby assumes control of the circuit. The transistor's conductance then increases and drastically reduces the potential across relay winding 13, thereby tripping contacts 11. To prevent stand-off currents from flowing through the emitter resistor 16, conductor 30 and resistor 28, the diode 32 is interposed in the shunt circuit across emitter resistor 16 between the emitter and the conductor 30.

A similar effect to that just described is obtained when the thermistor temperature declines to extremely low values. This is because at very low temperatures the resistance of the thermistor is too low to support sufficient stand-off currents to neutralize the fail-safe bias circuit. An illustration of the low temperature effect may be found in FIG. 4 which represents a more comprehensive portion of characteristic curve B shown in FIG. 2. The operation of the circuit at thermistor temperatures above 80° C. is as has been described in connection with the earlier figures. Between 80° C. and —20° C. the relay winding potential is substantially constant at approximately 9 volts, more than sufficient to hold the relay contacts closed. Below —20° C., however, the relay potential drops off sharply until at about —40° C. it reaches the trip point of three volts. The thermistor's resistance at such low temperatures is very large. Circuit-wise a break in the thermistor connection resulting in an effectively infinite resistance may be compared to an extremely low temperature condition which would also cause the thermistor to have a very high resistance. Therefore FIG. 4, although derived in part from temperature measurements, illustrates equally well the principles of operation of the fail-safe features in the FIG. 1 circuit.

In summary, as long as substantial currents flow in the thermistor 23, a portion of these currents dividing into the fail-safe bias circuit to place a positive potential therein, little or no base current can flow in the fail-safe bias circuit to control the system. Should the thermistor current be interrupted, however, or fall below a certain minimum level, the fail-safe bias circuit assumes control of the overall system and causes a protective de-energization of the load.

Contributing to the fail-safe qualities of the system described it should also be noted that if the transistor should fail in the short circuited condition, the most common effect of transistor failure, the relay will "trip" or de-energize the load because the relay winding 13 is connected in parallel with transistor 14 to respond to the potentials developed thereacross.

While I have shown but a single embodiment of my invention, it should be understood that this has been purely illustrative in nature and has been set forth as a preferred form which the invention might take. Since certain alternations, substitutions and other variations in the circuit will doubtless occur to those skilled in the art to which the invention pertains, I intend to cover by the appended claims all such variations as fall within the true spirit and scope of this invention.

What I claim as new and desire to secure by Letters Patent of the United States is:

1. A control circuit comprising: means for supplying an operating potential; a transistor having emitter, collector and base electrodes; a load circuit including at least one resistor and said transistor connected in series with each other across said potential supplying means, whereby changes in the conductance of said transistor vary the potential dropped across said transistor; a magnetically operated switching device in said load circuit having an operating winding connected in parallel with said transistor and responding to the potentials developed across said transistor to perform a control operation; a first resistive bypass network connected to supply to the base electrode of said transistor a normally fixed bias potential derived from said operating potential; a condition responsive resistor connected between the emitter and the emitter side of said potential supplying means, the resistance of said condition responsive resistor varying in accordance with a variable condition thereby to vary the emitter to base potential; a fail-safe bias circuit connected between the base of said transistor and the collector side of said potential supplying means to draw a control current through said base electrode; and a circuit connection shunting a portion of the current from said condition responsive resistor into said fail-safe bias circuit to render the latter inactive when substantial currents are flowing in said condition responsive resistor.

2. Apparatus for governing the energization of an electrical load in response to a variable condition comprising: means including an electrically controlled switching device for controlling the application of electrical energy to a load device; means including a transistor having a base electrode and emitter and collector electrodes connected to supply a controllable potential to said switching device to switch it selectively between on and off states; a first bias network connected to supply a normal operating potential to said base electrode; a condition-responsive resistor the resistance of which varies in accordance with said variable condition; circuit means including said condition responsive resistor for varying the potential on the emitter electrode of said transistor with respect to the potential on its base electrode thereby to vary the base current permitted to flow and control the conductance of said transistor; a second bias network operative only in response to an unusual increase in the resistance of said condition responsive resistor to draw base current through said transistor thereby to actuate said switching device.

3. Apparatus for governing the energization of an electrical load in response to a temperature condition comprising: means including an electrically controlled switching device for controlling the application of electrical energy to a load device; means including a transistor having a base electrode and emitter and collector electrodes connected to supply a controllable potential to said switching device to switch it selectively between on and off states; a first bias network connected to supply a normal operating potential to said base electrode; a thermistor having a negative temperature coefficient of resistance exposed to a variable temperature condition; circuit means including said thermistor for varying the potential on the emitter electrode of said transistor with respect to the potential on its base electrode thereby to control the conductance of said transistor; a second bias network operative only in response to an unusual increase in the resistance of said thermistor for altering the base potential on said transistor to increase the emitter-to-base potential thereby to actuate said switching device.

4. Apparatus for governing the energization of an electrical load in response to a variable condition comprising: a transistor having emitter, collector and base electrodes; means for supplying an operating potential across said emitter and collector electrodes; control means responsive to the conductance of said transistor for performing a control function; a first resistance biasing network connected to supply normal operating potentials to said base electrode; means including a condition responsive resistor connected between one side of said potential supplying means and said emitter, the resistance of said condition responsive resistor varying between high and low values in accordance with said variable condition to vary the emitter-to-base potential thereby to vary the conductance of said transistor; a second resistance bias network connected between the other side of said potential supplying means and said base electrode to draw current through said base electrode and enhance the conductance of said transistor; and circuit means responsive to a minimum level of currents through said condition responsive resistor to prevent base currents from flowing in said second bias network, whereby the failure of said minimum level of current to flow in said condition responsive resistor invariably occasions said transistor to exhibit enhanced conductivity.

5. Apparatus for governing the energization of an electrical load in response to a temperature condition comprising: a transistor having emitter, collector and base electrodes; means for supplying an operating potential across said emitter and collector electrodes; control means responsive to the conductance of said transistor for performing a protective control function when the conductance of said transistor is enhanced a first resistance biasing network connected to supply normal operating potentials to said base electrode; means including a thermistor having a negative temperature coefficient of resistance connected between one side of said potential supplying means and said emitter, the resistance of said thermistor varying between high and low values in accordance with a temperature condition to which it is exposed to vary the emitter-to-base potential thereby to vary the conductance of said transistor; a fail-safe resistance bias network connected between the other side of said potential supplying means and said base electrode to draw current through said base electrode and enhance the conductance of said transistor; and circuit means responsive to a minimum level of currents through said thermistor to prevent base currents from flowing in said fail-safe bias network, whereby the failure of said minimum level of current to flow in said thermistor permits said fail safe bias network to enhance the conductance of said transistor.

6. Fail-safe control apparatus comprising: supply conductors for supplying an operating potential; a transistor having a emitter, collector and base electrodes; means including an emitter resistor and a collector resistor connecting said transistor across said supply conductors; a magnetically operated switching device having normally open switch contacts for controlling the energization of an electrical load and having an operating winding connected in parallel with said transistor through its emitter and collector electrodes, said switching device responding to changes in potential across said transistor to close its contacts when the transistor potential is high and to open its contacts when the transistor potential is low, means for controlling the potential across said transistor including a first resistive bias network connected across said supply conductors and to the base electrode of said transistor for establishing at said base electrode a normal operating potential, and a shunt circuit including a thermistor having a negative temperature coefficient of resistance connected in parallel with said emitter resistor to vary the emitter potential in accordance with the temperature condition to which the thermistor is exposed; and means for reducing the potential across said transistor to open the contacts of said switching device in response to an unusual diminution or interruption of current in said thermistor including a fail-safe resistive bias circuit connected between said base electrode and the supply conductor on the collector side of said transistor for drawing base currents through said transistor, a conductor connecting an intermediate portion of said fail-safe bias circuit equipotentially with the portion of said shunt circuit on the emitter side of said thermistor, and a diode interposed in said shunt circuit between the connection point of said last-mentioned conductor and poled in a direction to prevent reverse current flow in said shunt circuit.

References Cited in the file of this patent
UNITED STATES PATENTS 2,859,402     Schaeve _____ Nov. 4, 1958

FOREIGN PATENTS 197,888     Austria _____ May 27, 1958